(12) United States Patent
Popescu-Stanesti et al.

(10) Patent No.: US 6,989,981 B2
(45) Date of Patent: Jan. 24, 2006

(54) BATTERY OVER VOLTAGE AND OVER PROTECTION CIRCUIT AND ADJUSTABLE ADAPTER CURRENT LIMIT CIRCUIT

(75) Inventors: Vlad Popescu-Stanesti, San Jose, CA (US); Laszlo Lipcsei, San Jose, CA (US); Stephen Gustafson, Round Rock, TX (US)

(73) Assignee: 02Micro International Limited, Grand Cayman (KY)

(*) Notice: Subject to any disclaimer, the term of this patent is extended or adjusted under 35 U.S.C. 154(b) by 237 days.

(21) Appl. No.: 10/279,345

(22) Filed: Oct. 24, 2002

(65) Prior Publication Data
US 2004/0080892 A1 Apr. 29, 2004

(51) Int. Cl.
H02H 9/08 (2006.01)

(52) U.S. Cl. .................. 361/93.9; 361/91.1

(58) Field of Classification Search ............ 361/18, 361/91.1, 91.2, 91.4, 93.7, 93.8, 93.9, 111, 361/110; 320/136, 141, 139, 143, 145
See application file for complete search history.

(56) References Cited

U.S. PATENT DOCUMENTS

| | | | |
|---|---|---|---|
| 5,187,425 A | 2/1993 | Tanikawa | 320/31 |
| 5,204,611 A | 4/1993 | Nor et al. | 320/21 |
| 5,465,039 A | 11/1995 | Narita et al. | 320/32 |
| 5,610,503 A | 3/1997 | Fogg et al. | 323/283 |
| 5,694,025 A | 12/1997 | Oglesbee et al. | 320/49 |
| 5,698,964 A | 12/1997 | Kates et al. | 320/22 |
| 5,726,554 A | 3/1998 | Freiman et al. | 320/21 |
| 5,898,234 A | 4/1999 | Kitagawa | 307/48 |
| 5,982,148 A | 11/1999 | Mercer | 320/134 |
| 5,994,875 A | 11/1999 | Lee | 320/132 |
| 6,031,359 A * | 2/2000 | Michelsen et al. | 320/141 |
| 6,118,254 A | 9/2000 | Faulk | 320/141 |
| 6,137,267 A * | 10/2000 | Kates et al. | 320/136 |
| 6,181,107 B1 | 1/2001 | Hirose | 320/134 |
| 6,184,660 B1 | 2/2001 | Hatular | 320/141 |
| 6,246,215 B1 | 6/2001 | Popescu-Stanesti | 320/139 |
| 6,326,771 B1 | 12/2001 | Popescu-Stanesti | 320/139 |
| 6,329,796 B1 | 12/2001 | Popescu | 320/134 |

OTHER PUBLICATIONS

Copy of Office Action from Taiwan along with English Translation dated Dec. 13, 2004.

* cited by examiner

Primary Examiner—Brian Sircus
Assistant Examiner—Danny Nguyen
(74) Attorney, Agent, or Firm—Grossman, Tucker, Perreault & Pfleger PLLC

(57) ABSTRACT

A battery charging circuit is disclosed that includes protection circuitry and/or adapter current limit offset circuitry. The protection circuitry is operable to reduce or eliminate an overvoltage and overcurrent condition generated by a charge controller when a charging path is an open circuit, for example, when a battery is disconnected from the charging path. The adapter current limit offset circuitry is operable to generate an offset signal to an adapter current signal utilized by a charger controller.

14 Claims, 4 Drawing Sheets

US 6,989,981 B2

BATTERY OVER VOLTAGE AND OVER PROTECTION CIRCUIT AND ADJUSTABLE ADAPTER CURRENT LIMIT CIRCUIT

FIELD OF THE INVENTION

The present invention relates to a battery over voltage and over current protection circuits, and adjustable adapter current limit circuits.

BACKGROUND OF THE INVENTION

FIG. 3 depicts a conventional protection circuit topology 200. The circuit 200 includes conventional battery charging circuit 20 and a protection circuit formed by a diode 204 and resistor 202 between the battery 40 and the adapter source 22. The battery charging components are well understood in the battery charging art, and include a charger controller 30, a Buck converter represented by the switches 26 and 28, the inductor 32 and the capacitor 34, and a reverse current protection switch 38. The charger 30 controls the Buck converter's switches 26 and 28 using conventional PWM techniques to generate a charging current to the battery 40. The current source is typically an adapter 22. The charger controller controls the amount of current to the battery using feedback information from sense resistors R1 (24) and R2 (36). Sense resistor R1 generates a feedback signal indicative of the amount of current drawn from the adapter 22. Sense resistor R2 generates a feedback signal indicative of the amount of charging current generated by the Buck converter. This feedback data is used to control the duty cycle, and thus the charging current, generated by the charger.

In operation, the charger controller adjusts the duty cycle (PWM) of the switches 26 and 28 to adjust the amount of charging current delivered to the battery. The operation of the charging components 20 are described in further detail in U.S. Patent application Ser. No. 09/948,828 (now U.S. Pat. No. 6,498,461) and U.S. Pat. No. 6,459,602, all of which are incorporated by reference in their entirety as teaching these conventional components and variations thereof.

When the battery disconnects, the charging path (defined between the adapter and the battery) is an open circuit. The limit resistor 202 and diode 204 operate to increase the voltage at the voltage feedback pin (VFB) of the charger, because switch 38 is opened by a control signal generated by the controller 30. As a result, the charger will decrease the duty cycle, and the voltage on the capacitor 34 decreases. When the battery reconnects, the voltage on the capacitor 34 is smaller than the voltage across the battery, and therefore the body diode of switch 38 is reverse biased. In this situation, inrush current into the battery is reduced or eliminated, and the duty cycle of the controller slowly increases to continue charging the battery.

However, this topology does not include a mechanism to prevent or reduce an over-voltage condition at the battery terminals.

SUMMARY OF THE INVENTION

In one aspect, the present invention provides a battery charger circuit that includes a battery charging circuit comprising a charge controller generating a charging current and voltage along a charging path based on the duty cycle of PWM signal generated by said controller. A protection circuit is coupled to the charging path and adapted to reduce said duty cycle of said switches when said charging path is an open circuit, and thereby reduce the voltage and current generated by the PWM signal.

In another aspect, the present invention provides a battery charger circuit that includes a battery charging circuit comprising a charge controller generating a charging current and voltage along a charging path based on the duty cycle of a PWM signal generated by said charge controller. The circuit also includes adapter current limit protection circuitry that generates an offset signal to an adapter current signal utilized by said controller.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
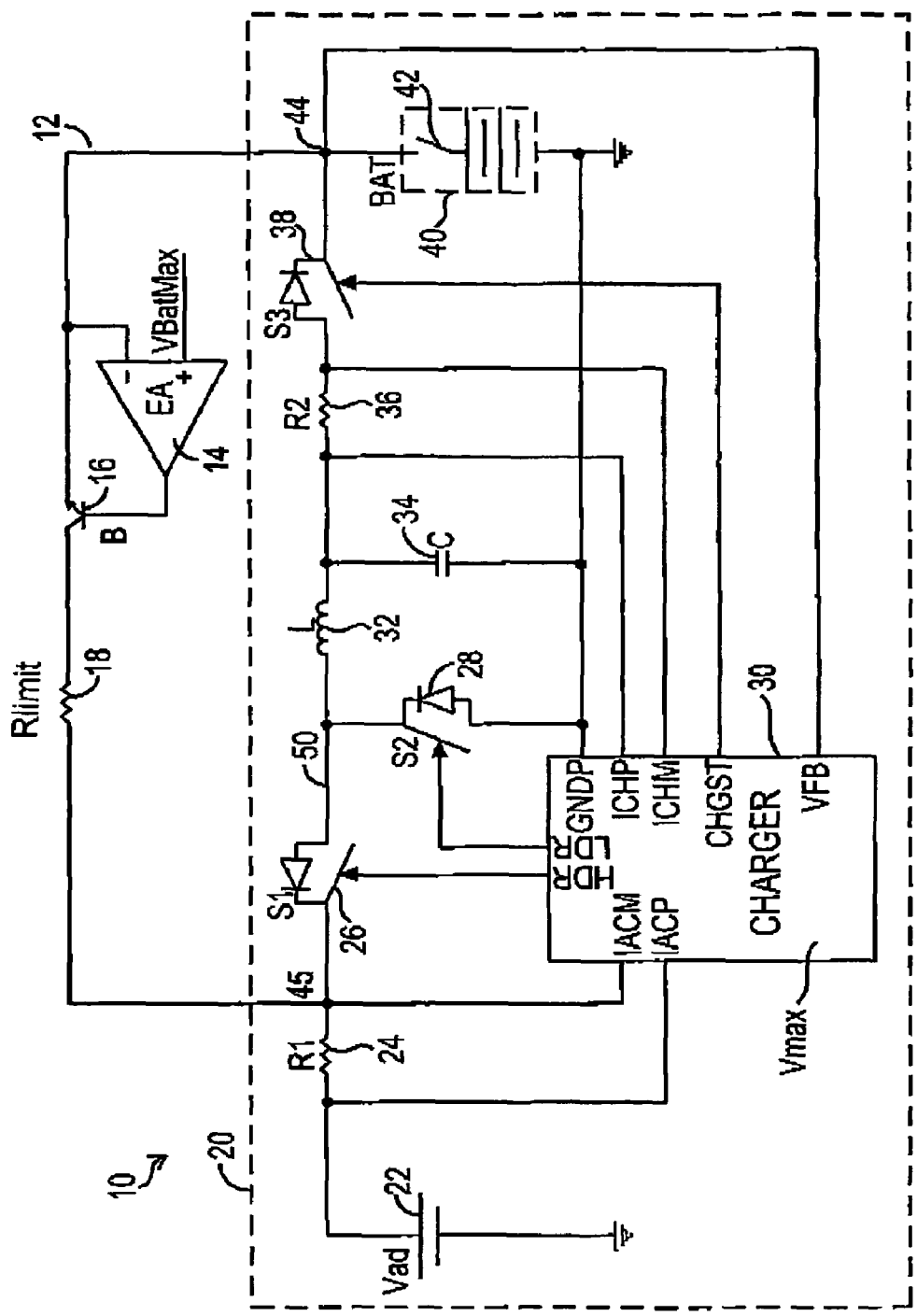
FIG. 1 is an exemplary protection circuit topology of the present invention.

FIG. 1 is an exemplary charger circuit 10 adapted with a protection circuit 12 adapted to prevent or reduce over voltage and over current when the charging path 50 is an open circuit (as may be, for example, when the battery disconnects from the charging path). The circuit 10 includes conventional battery charging circuit 20 and a protection circuit 12. As a broad overview, the protection circuit 12 is adapted to reduce the duty cycle of the PWM signals generated by a charger controller 30 when there is an open circuit condition along the charging path 50. The charging path 50 generally represents the path between the adapter 22 and the batteries 40, as controlled by the switches 26, 28 and 38. In an exemplary embodiment, the protection circuit 12 is adapted to reduce the duty cycle of the PWM signals generated by a charger controller 30 when the battery 40 is disconnected (or when there is an open circuit along the charging path), thereby reducing the voltage across the battery terminals (Node 44) and an inrush current when the battery reconnects.

The battery charging components are well understood in the battery charging art, and include a charger controller 30, a Buck converter represented by the switches 26 and 28, the inductor 32 and the capacitor 34, and a reverse current protection switch 38. The charger 30 controls the Buck converter's switches 26 and 28 using conventional PWM techniques to generate a charging current to the battery 40. The current source is typically an adapter 22. The charger controller controls the amount of current to the battery using feedback information from sense resistors R1 (24) and R2 (36). Sense resistor R1 generates a feedback signal indicative of the amount of current generated by the adapter 22.

Sense resistor R2 generates a feedback signal indicative of the amount of charging current generated by the Buck converter. This feedback data is used to control the duty cycle, and thus the charging current, generated by the controller. As described above with reference to components 20, in operation, the charger controller adjusts the duty cycle of the PWM signal generated, via switches 26 and 28, to adjust the amount of charging current delivered to the battery.

As is also understood in the battery arts, battery units 40 (e.g., Li Ion batteries) include an internal switch mechanism 42 to couple and decouple the battery cells from the charging circuit, for example, when the battery undergoes periodic calibration. In conventional battery charging systems, when the battery reconnects to the circuit the current at node 44 increases because the feedback information see an open circuit at the battery, and attempts to pump more current into the battery by increasing the duty cycle of the switches. Likewise, during periods when the battery is disconnected, the voltage across the battery terminals increases. Both of these conditions, when the battery reconnects, can damage the battery or the charger circuitry. One attempt in the prior art to reduce these effects may be to increase the speed of the control loop. However, even if the response time approaches zero (which would be extremely costly), the charge build-up on the capacitor 34 would still generate an inrush current when the battery reconnects.

Accordingly, the protection circuit 12 is adapted to reduce the duty cycle of the PWM signals generated by a charger controller 30 when the battery 40 is disconnected, thereby reducing the voltage across the battery terminals (Node 44) and an inrush current when the battery 40 reconnects. In one exemplary implementation, the protection circuit 12 is coupled to the charging path 50 at nodes 45 and 44 (although it is equally contemplated that the protection circuit 12 can be appropriately adapted to be coupled anywhere along the charging path). The circuit 12 includes a current limiting resistor 18 (Rlimit) and an active circuit comprising the error amplifier 14 and transistor 16 coupled to node 44 (the battery terminal node) and the adapter 22 through the adapter current sense resistor 24.

During normal operation when the battery is plugged-in and charging, the battery is connected. The connected battery generates a voltage feedback signal VFB, indicative of the voltage across the battery. In the exemplary embodiment, the programmable value VbatMax is slightly higher than the maximum rated voltage of the battery cells (as may be provided, for example, by the manufacturer of the battery). Slightly higher, as used herein shall be interpreted broadly to mean simply a higher value, which could be based on, for example, component tolerances, desired output, or a set value such as 2–5% higher. The present invention is intended to cover a wide range of values, and thus any higher value is deemed to be equivalent. Accordingly, when the battery is connected, the EA 14 will have a positive input; and its output stays high, saturating the transistor Q16. A current will flow from AC adapter, through R1 and Rlimit, to the battery. Rlimit is selected to limit this current at a low value compared with the main charging current through R1 and R2. The particular value of Rlimit is not important, and may be, for example, selected to permit a negligible percentage of charging current to flow through the circuit 12. In addition, or alternatively, to value of Rlimit 18 may be selected to provide a trickle charge to the battery when switch 38 is open.

When the internal switch 42 of the battery 40 switches OFF (to disconnect the battery), the charging path 50 between the adapter 22, through R1 and R2 to the battery 40 is an open circuit, and thus the main charging current through R1 and R2 drops to zero. The charger responds by signaling CHGST to turn switch S3 (38) OFF. The charger, receiving feedback information from the current loop of the charger, defined across R2 and feedback signals ICHP and ICHM, will try to keep the charging current at its programmed value by increasing the duty cycle of switches 26 and 28. This will increase the voltage on the capacitor C. The voltage on VFB (node 44) will increase also, and when VFB equals VbatMax the EA 14 will change state, causing transistor 16 to start working in the active region. This maintains VFB at the VbatMax level. Vmax is a programmable input signal to the charger, indicative of the maximum voltage of the battery's cells. At this point, VFB is greater than Vmax. The Vmax loop tries to keep VFB at Vmax level, and causes the charger to reduce the duty cycle, which in turn decreases the voltage on the capacitor 34. Since the S3 diode is now reversed biased, the loop is broken and the charger will proceed to reduce the duty cycle down to a programmable minimum value. Summarizing, with the internal switch of the battery OFF, the voltage on the battery terminal (VFB) will stay at VbatMax while the voltage on the capacitor C is small (compared to the battery voltage), corresponding to the minimum duty cycle (for 0% duty cycle it will be 0V).

When the battery's internal switch 42 turns back ON, the battery forces the VFB voltage to a point lower than VbatMax, thus saturating the transistor 16, as described above. The VFB voltage is smaller than Vmax, too, and the Vmax loop stops forcing the duty cycle to remain low. The duty cycle will start increasing from its low value, driven by both the current control loop and voltage control loop. When the duty cycle reaches the value at which the voltage on the capacitor C is big enough to forward bias the S3 diode, the charging current establishes again and the system comes back to the initial state. The over voltage and over current conditions are thereby reduced or eliminated.

Figure 2:
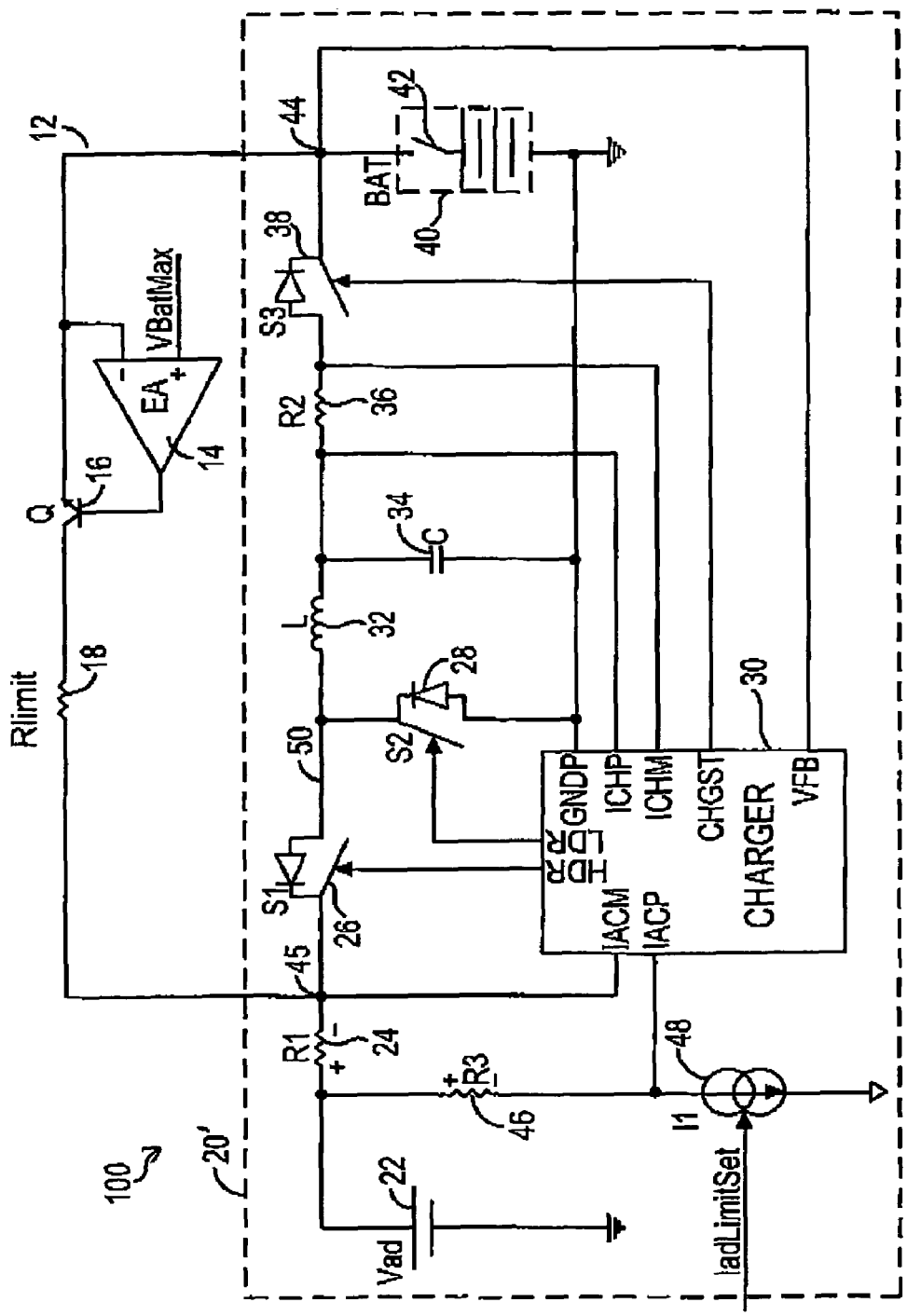
FIG. 2 is an exemplary adjustable adapter current limit circuit of the present invention.
Figure 3:
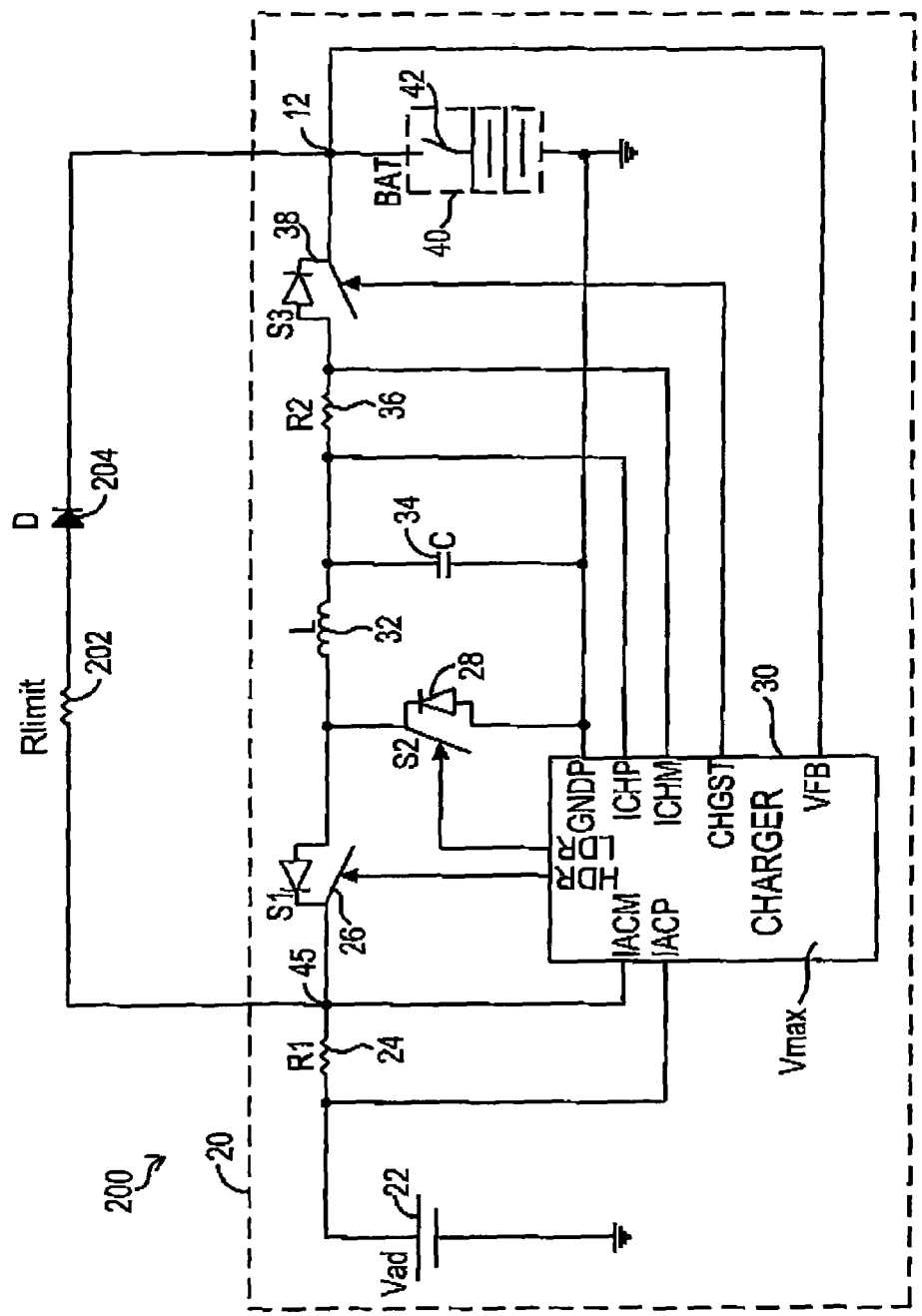
FIG. 3 is a conventional protection circuit topology.

FIG. 2 is an exemplary adjustable adapter current limit circuit 100 of the present invention. The components of the circuit 100 of FIG. 2 are similar to the components of the circuit 10 of FIG. 1, but in this exemplary embodiment the charger circuitry 20' is modified to include circuitry to adjust the adapter current limit. As is understood in the art, different adapters will range in the value of maximum rated current for the adapter. Some adapters now include a signal (not shown) indicative of the adapter's maximum rated current. Based on this signal, the system's micro-controller sets a voltage IadLimitSet that might be used by the charger circuitry to limit the adapter's current at an appropriate value. If the charger 30 is not modified to receive this value and accordingly adjust the draw from the adapter, the total current (system current and charger's input current) may exceed the adapter capability because the charger may attempt to draw too much current from the adapter, or incorrectly allocate available current between the battery (for charging) and the system (not shown, but generally the schematic includes a system such as a portable computer that receives power from the adapter via R1). Alternatively, if the charger includes a fixed adapter current rating, then using a larger adapter would go underutilized since the charger would be incapable of using current beyond the fixed value programmed into the charger controller.

Some chargers have a fixed internal limit for the adapter current; it is set as a limit voltage Vad_sense_lim between IACM and IACP. When this threshold is exceeded, to adapter current loop (across R1) starts to reduce the charging current to keep to total adapter current within the limit. The adapter current limit is Vad_sense_lim/R1. To choose the adapter current limit, one has to choose the adapter current sense resistor R1. If adapters of different current capabilities are going to be used with the same system, it is unpractical to change the sense resistor every time the end user changes to adapter type. The alternative solutions are to change the limit of the sensed voltage Vad_sense_lim, or to add an offset to the voltage picked-up from the sense resistor R1. So, keeping constant the internal limit at Vad_sense_lim, the voltage drop on the sense resistor is altered before reaching IACP and IACM pins by the additional offset, letting the user to get different voltage limit across R1, thus different current limits. This is achieved by the topology 20' of FIG. 2. In this exemplary embodiment a resistor R3 and current source 48 are connected between R1 and the adapter 22, thereby modifying the adapter current control loop across R1. This current can be modified by the microcontroller in order to accommodate different adapter sizes.

Thus, the current across R3 offsets the current across R1. In this exemplary embodiment, the current generated by the current source is set by the adapter current limit signal IadLimitSet. Of course, the current generated by the current source could be a fixed, preset value, chosen, for example, to accommodate most adapters on the market. By inspection, the feedback value into the controller is represented by the voltage drop on R1 minus the voltage drop on R3, Vr1−Vr3.

Figure 4:
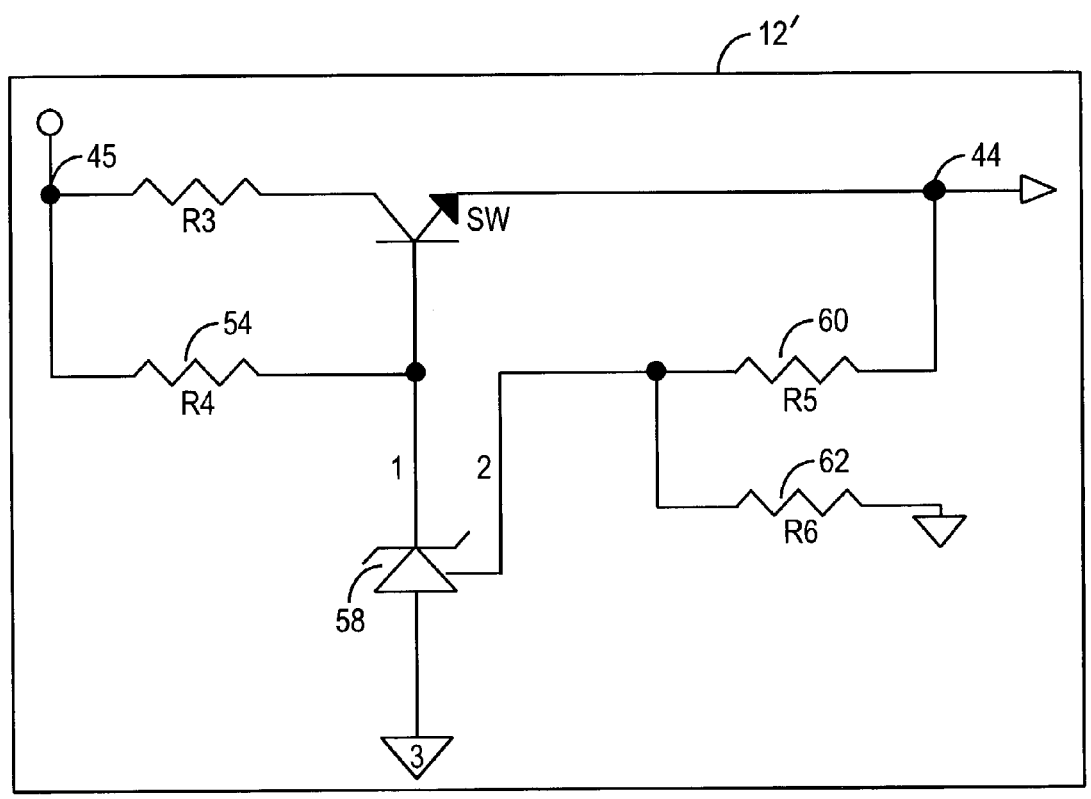
FIG. 4 is an exemplary alternative embodiment of the protection circuit of the present invention.

Those skilled in the art will recognize numerous modifications that may be made to the present invention. For example, the overvoltage and overcurrent protection circuitry 12 depicted in FIG. 1 is only one exemplary implementation. FIG. 4 depicts an exemplary alternative embodiment of the protection circuit 12' of the present invention. In this exemplary embodiment, a shunt regulator 58 is used to limit the battery open voltage (in much the same way as the error amplifier 14 of FIGS. 1 and 2). As before, the protection circuit 12' is coupled to the charging path 50 (e.g., between nodes 45 and 44). Resistor 54 (R4) provides the base current to the transistor 16, and cathode current to the shunt regulator 58. Accordingly, the value for R4 is selected to provide an appropriate base current and cathode current. Typically, although not required, R4>R3. A voltage divider represented by R5 (60) and R6 (62) provides a reference voltage for the shunt regulator 58. Typically, R5 is greater than R6. The operation of the shunt regulator 58 and the voltage divider of R5 and R6 is similar to the operation of the error amplifier discussed above, and will be readily understood by those skilled in the arts. Those skilled in the art will recognize that numerous other circuit topologies may be implemented to reduce the duty cycle of the PWM signal generated by the controller in a manner that an overvoltage and overcurrent condition is reduced or eliminated, and the embodiments of FIGS. 1, 2 and 4 are provided as examples of such circuitry and are not intended to limit the scope of the present invention to the particular topologies depicted therein.

The components depicted in FIGS. 1, 2 and 4 may include conventional off-the-shelf components and/or custom or proprietary components. The transistor 16 is depicted in the figures as a conventional NPN device, however any transistor (e.g. FET) may suffice and is deemed equivalent to present invention. All such alternatives are deemed within the spirit and scope of the present invention, only as limited by the claims.

What is claimed is:

1. A battery charger circuit comprising a charge controller generating a charging current and voltage along a charging path based on a duty cycle of a PWM signal generated by said controller; and a protection circuit coupled to said charging path and adapted to reduce said duty cycle of switches when said charging path is an open circuit, and thereby reduce the voltage and current generated by said PWM signal, wherein said protection circuit comprises a current limiting resistor in series with a transistor, a conduction state of said transistor being controlled by an error amplifier, said error amplifier receiving a first input indicative of a desired maximum voltage, and a second input indicative of the voltage generated by said charging circuit.

2. A battery charger circuit as claimed in claim 1, wherein said charging circuit further comprises a buck converter circuit including an inductor along said charging path and capacitor parallel to said charging path, and wherein the voltage on said capacitor is reduced by said protection circuit when said charging path is an open circuit.

3. A battery charger circuit as claimed in claim 2, wherein the current through said inductor is reduced by said protection circuit when said charging path is an open circuit.

4. A battery charger circuit as claimed in claim 1, further comprising adapter current limit protection circuitry that generates an offset signal to an adapter current signal utilized by said controller.

5. A battery charger circuit as claimed in claim 4, wherein said charging path further comprises a sense resistor generating a feedback signal indicative of current supplied by an adapter, and wherein said adapter current limit protection circuitry comprises a resistor in series with a current source to generate said offset to said feedback signal indicative of said current supplied by said adapter.

6. A battery charger circuit, comprising comprising a charge controller generating a charging current and voltage along a charging path based on a duty cycle of a PWM signal generated by said charge controller, said charging path further comprising a sense resistor generating a feedback signal indicative of current supplied by an adapter, said battery charging circuit further comprising adapter current limit protection circuitry that generates an offset signal to said feedback signal to alter said feedback signal to accommodate different types of said adapter having different maximum current ratings wherein said adapter current limit protection circuitry comprises a resistor in series with a current source to generate said offset signal.

7. A battery charger circuit as claimed in claim 6, further comprising a protection circuit coupled to said charging path and adapted to reduce said duty cycle of said PWM signal by said controller when said charging path is an open circuit, and thereby reduce the voltage and current generated by said PWM signal.

8. A battery charger circuit as claimed in claim 7, wherein said charging circuit further comprises a buck converter circuit including an inductor along said charging path and capacitor parallel to said charging path, and wherein the voltage on said capacitor being reduced by said protection circuit when said charging path is an open circuit.

9. A battery charger circuit as claimed in claim 7, wherein the current through said inductor is reduced by said protection circuit when said charging path is an open circuit.

10. A battery charger circuit, comprising comprising a charge controller generating a charging current and voltage along a charging path based on a duty cycle of a PWM signal generated by said charge controller, said charging path further comprising a sense resistor generating a feedback signal indicative of current supplied by an adapter, said battery charging circuit further comprising adapter current limit protection circuitry that generates an offset signal to said feedback signal to alter said feedback signal to accommodate different types of said adapter having different maximum current ratings, wherein said battery charging circuit further comprises a protection circuit counted to said charging path and adapted to reduce said duty cycle of said PWM signal by said controller when said charging path is an open circuit, and thereby reduce the voltage and current generated by said switches wherein said protection circuit comprises a current limiting resistor in series with a switch, the conduction state of said switch being controlled by an error amplifier, said error amplifier receiving a first input indicative of a desired maximum voltage, and a second input indicative of the voltage generated by said charging circuit.

11. A battery charger circuit, comprising comprising a charge controller generating a charging current and voltage along a charging path based on a duty cycle of a PWM signal generated by said controller; a protection circuit coupled to said charging path and adapted to generate feedback data to said charge controller to reduce said duty cycle of switches when said charging path is an open circuit, and thereby reduce the voltage and current generated by said switches, said charging path further comprising a sense resistor generating feedback signal indicative of current supplied by an adapter, said battery charging circuit further comprising adapter current limit protection circuitry that generates an offset signal to said feedback signal to alter said feedback signal to accommodate different types of said adapter having different maximum current ratings wherein said protection circuit comprises a current limiting resistor in series with a transistor, the conduction state of said transistor being controlled by a shunt regulator, said shunt regulator receiving a reference signal generated by the output of said transistor.

12. A battery charger circuit as claimed in claim 11, wherein said charging circuit further comprises a buck converter circuit including an inductor along said charging path and capacitor parallel to said charging path, and wherein the voltage on said capacitor is reduced by said protection circuit when said charging path is an open circuit.

13. A battery charger circuit as claimed in claim 11, wherein the current through said inductor is reduced by said protection circuit when said charging path is an open circuit.

14. A battery charger circuit as claimed in claim 11, further comprising a voltage divider circuit coupled to said output of said transistor, said voltage divider generating said reference signal.

* * * * *